US005372453A

United States Patent [19]

Argandona

[11] Patent Number: 5,372,453

[45] Date of Patent: Dec. 13, 1994

[54] FUEL SPILL CONTAINMENT DEVICE

[76] Inventor: Toby Argandona, 21221 Running Branch Rd., Diamond Bar, Calif. 91765

[21] Appl. No.: 18,072

[22] Filed: Feb. 12, 1993

[51] Int. Cl.[5] .......................... B65G 5/00; B65B 3/06

[52] U.S. Cl. .......................... 405/52; 137/371; 141/86; 405/128; 588/249

[58] Field of Search .................... 405/52, 53, 128, 129; 137/363, 371; 141/86; 220/484; 588/249

[56] References Cited

U.S. PATENT DOCUMENTS 4,552,166 11/1985 Chadbourne et al. ............ 405/52 X
4,593,714 6/1986 Madden .......................... 137/371
4,659,251 4/1987 Petter et al. .................... 405/52
4,762,440 8/1988 Argandona ...................... 405/52
4,802,792 2/1989 Flessas ........................... 405/52 X
4,960,346 10/1990 Tamayo ......................... 405/52
5,058,633 10/1991 Sharp ............................ 137/371 X
5,114,271 5/1992 Sunderhaus et al. ............. 405/52
5,117,877 6/1992 Sharp ............................ 405/52 X

*Primary Examiner*—Dennis L. Taylor
*Attorney, Agent, or Firm*—Boniard I. Brown

[57] ABSTRACT

A fuel spill containment system for use with an underground fuel tank has two upstanding fill tubes extending upwardly from the tank through the bottom wall of a spill container. Each tube has an adjustable sealed connection with the container bottom wall to adapt to the container for different fill tube spacings. The spill container is floatably positioned within a protective casing having an overhead cover with an access opening above the fill tubes. A flexible annular sleeve extends from the spill container side wall to the overhead cover to form a flexible liquid-tight closure about the container upper edge. Dislocations of the casing or spill container, caused by earth movements, as from freezing or earthquake, are safely absorbed by the flexible sleeve, thereby preventing earth stresses from breaking connections between the casing and the container.

23 Claims, 3 Drawing Sheets

FUEL SPILL CONTAINMENT DEVICE

BACKGROUND OF THE INVENTION

1. Field of the Invention

The present invention relates to a spill containment device for the fill tubes of underground storage tanks, particularly tanks for environmentally hazardous liquids such as gasoline and other petroleum products.

2. Prior Art

U.S. Pat. No. 4,762,440 of the present invention shows various forms of an in-ground spill containment device usable to prevent spilled liquids, such as gasoline, from draining or seeping into the ground to possibly contaminate the soil and/or water supply. The device comprises a container that supports and surrounds one or more fill tubes (pipes) that extend downward to an underground liquid fuel storage tank so that fuel spilled during or after the tank-filling process is trapped in the container and does not migrate through the ground. A manually-operated valve in the bottom wall of the container drains the spilled liquid fuel through an auxiliary drain line into the tank, whereby fuel is prevented from accumulating in the container. To prevent rainwater from entering the container and mixing with liquid fuel, a removable cover is provided over the access opening at the top of the container. An edge of the cover seats in a water drain channel that surrounds the access opening, whereby surface water is trapped within the drain channel instead of possibly running down into the container. At least one drain conduit leads from the drain channel into the ground or onto the adjoining ground surface for draining water out of the channel.

The '440 patent shows various configurations the spill containment device can take. One structural arrangement comprises two separate fill pipes extending upwardly within a single rectangular container, each fill pipe extending downwardly to a different underground fuel storage tank.

The rectangular container is disposed within a surrounding cylindrical casing which spaces the container from the surrounding earth, thereby protecting the container from deformation or damage from the earth shifting or possibly corroding the container material. The cylindrical casing has a relatively heavy metal cover substantially flush with the ground or concrete surface. Two lighter covers are disposed over separate access openings in the spill containment container above the respective fill pipes. The individual covers may be removed individually, depending on which fill pipe is being used in a particular instance.

In another configuration shown in the '440 patent, the spill container comprises a cylindrical container embedded in a concrete slab that has its upper surface flush with the ground surface or concrete pavement surface. A single fill tube extends upwardly through the bottom wall of the cylindrical container for access through a top opening in the container body. The rim of the container forms a drain channel that intercepts surface water that might otherwise flow into the container.

SUMMARY OF THE INVENTION

The present invention relates to mechanisms for adjustably connecting two separate fill tubes to the bottom wall of a spill container so as to compensate for variations in tube spacing. The adjustable connections enable the installer to make the necessary connections quickly, without cutting special holes in the container bottom wall or bending the fill tubes to fit holes having a different spacing than the fill tubes.

The adjustable connection mechanism may comprise two oversize clearance openings formed in the container bottom wall, said openings being spaced apart the same distance as the nominal spacing between the two fill tubes. Each tube preferably comprises a multipiece assembly that includes a lower coupling flange (or coupling element) adapted to seat against the undersurface of the container bottom wall. The tube per se may comprise upper and lower tube elements threaded into the lower coupling flange. Each tube assembly further includes an upper coupling flange (or coupling element) adapted to seat on the upper surface of the container bottom wall.

Each tube assembly is separately clamped to the container bottom by a set of screws surrounding the upper and lower tube elements. The screws extend downwardly through the upper coupling flange into threaded holes in the lower coupling flange, whereby the screws can draw the coupling flanges toward each other so that the coupling flanges have clamping engagement with the intermediate container bottom wall.

A feature of the invention is that the screws extend through the oversize clearance opening formed in the container bottom wall. Each clearance opening is sized so that the screws are closer to the tube axis than the edge of the clearance opening. Therefore, the container can be shifted laterally in any desired direction to permit the tube assembly to extend through the clearance opening without interference between the screws and the bottom wall edge of the opening.

Preferably, each tube assembly has an oversize clearance opening, two coupling flanges, and two sets of clamping screws, whereby each tube assembly has an adjustable fit relative to the container bottom wall. In another arrangement, only one of the tube assemblies has an adjustable fit relative to the container bottom wall. With either arrangement the coupling flanges, in cooperation with the oversize clearance openings, provide compensation for variations in the lateral spacing between the tube assemblies. The spill container can therefore be manufactured in a factory setting, without necessity for onsite cutting of the container bottom wall to adapt the container to different fill tube spacings that might be encountered.

The invention concerns a mechanism for adjustably connecting the spill container with an associated casing embedded or otherwise mounted in-ground. In one arrangement, the adjustable connection comprises a flexible sleeve having a lower annular edge thereof connected to the side wall of the spill container, and an upper annular edge thereof connected to the casing.

The sleeve has a significant degree of slack or looseness so that the container is, in effect, floatably positioned within the casing. The container is rigidly attached to the aforementioned fill tubes, while being adjustable relative to the surrounding casing via the flexible sleeve. The sleeve compensates for variations in the position of the spill container relative to the ground level casing and its cover. This compensation is desirable in that it permits the casing to be installed in a fixed location in the ground without having to precisely locate the casing relative to a particular spill container location. The casing can be installed before or after installation of the spill container on the fill tubes.

Some variations in casing location can be tolerated while still achieving an operative connection between the casing and the spill container. For example, the casing can be installed in a level attitude, with its cover flush with the surrounding concrete (ground) surface. The spill container may have different attitudes while still being connectable to the casing cover via the flexible sleeve. For example, the container may be slightly tilted or offset relative to the casing and cover axis while still having an operative connection with the casing. Also, the spill container can be located relatively close to the casing cover or relatively far below the casing cover while still being operatively connected to the casing. It is not necessary to locate the spill container at a specific or precise elevation within the surrounding casing.

The flexible sleeve connection between the spill container and the casing provides the important advantage of accommodating spill container movement vertically or laterally, caused by any shifting of the earth and the fuel tank after installation of the spill containment system. Such earth and tank shifting can occur, e.g., because of normal settling of earth following an excavation, the raising and lowering of the earth crust as a result of earth freezing and thawing, or earth movement associated with earthquakes.

The invention provides a distinct advantage in the elimination of any conduit between the spill container and a riser or standpipe to conduct fuel in the container to a fuel tank via a riser. A valve in the container is operable to remove any liquid fuel from the container via an adjacent one of the tube assemblies.

Entry of water into the spill container is eliminated by the apparatus of the invention. Upwardly extending channels extend about and across an access opening of the spill container, and conduct surface water across the access opening under a cover plate over the opening, thus to prevent any of the water from falling into the spill container.

DESCRIPTION OF A PREFERRED EMBODIMENT OF THE INVENTION

Figure 1:
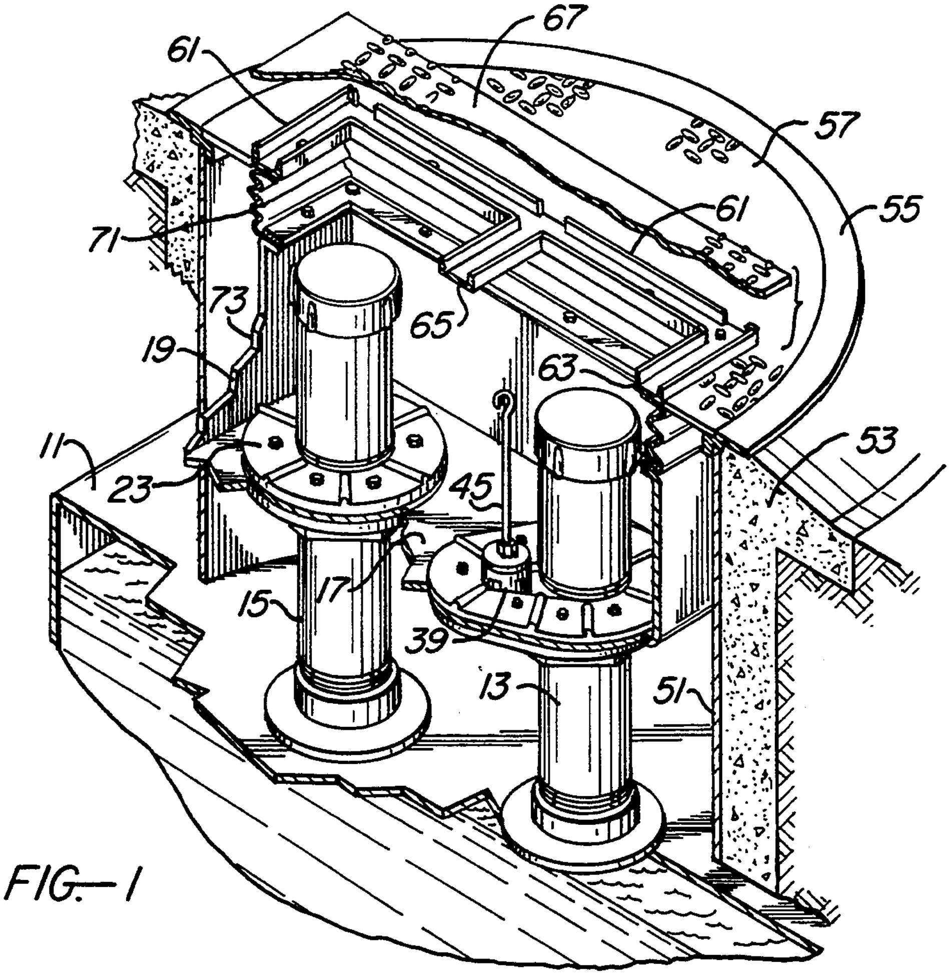
FIG. 1 is a perspective sectional view of a spill containment system according to the present invention, partially broken away to illustrate interior details.
Figure 2:
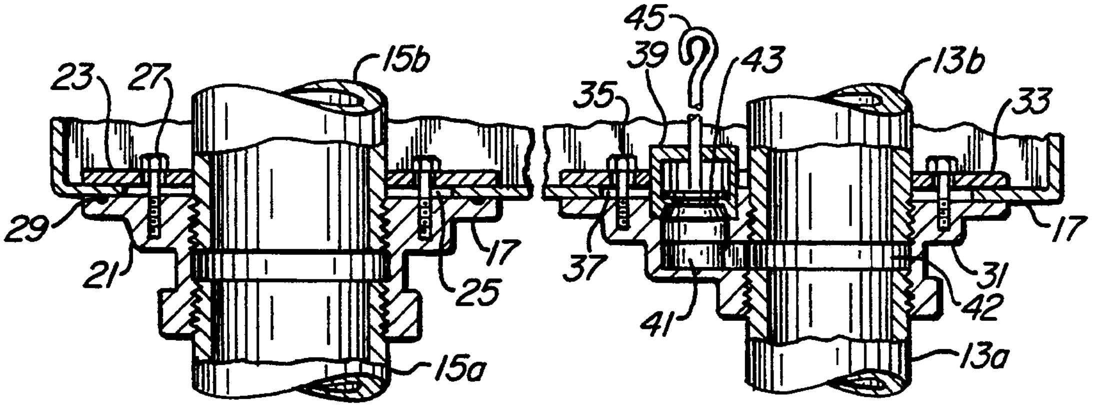
FIG. 2 is a fragmentary sectional view taken at line 2—2 transversely in FIG. 1.
Figure 3:
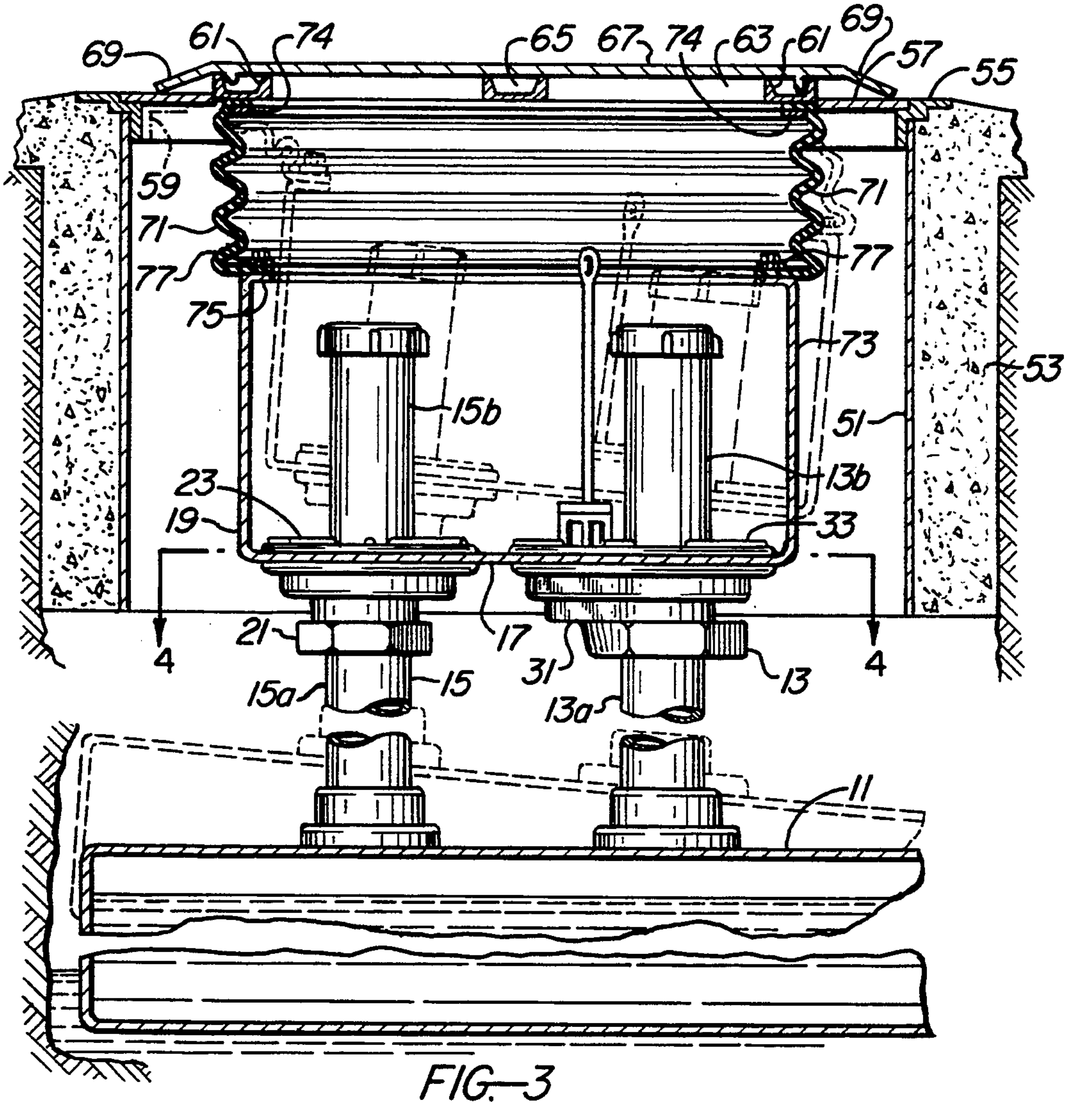
FIG. 3 is an elevational sectional view of the spill containment system of FIG. 1.

FIGS. 1 through 4 show a spill containment system according to the present invention located above an underground liquid storage tank 11, typically a gasoline or diesel fuel tank. As shown in FIGS. 1 and 3, two fill tubes (pipes) 13 and 15 extend upwardly from the top wall of tank 11 and through bottom wall 17 of a spill container 19. Each tube is a relatively rigid pipe having a rigid threaded connection with a threaded coupling member 20 welded to the top wall of tank 11. Tube 13 serves to introduce liquid into tank 11, and tube 15 acts as a vent or relief tube to vent vapors upwardly out of the tank.

Each tube 13, 15 comprises two separate tube elements, a lower tube element **13*a* or 15*a* located below spill container 19, and an upper tube element 13*b* or 15*b* located within the spill container. FIG. 2 shows the manner in which the upper and lower tube elements are connected together. An annular coupling flange 21 has a threaded connection with the upper threaded end of tube element 15*a*. The lower end of tube element 15*b* threads into an upper threaded portion of coupling flange 21**, whereby the flange defines a fluid connection between the aligned tube elements.

Figure 4:
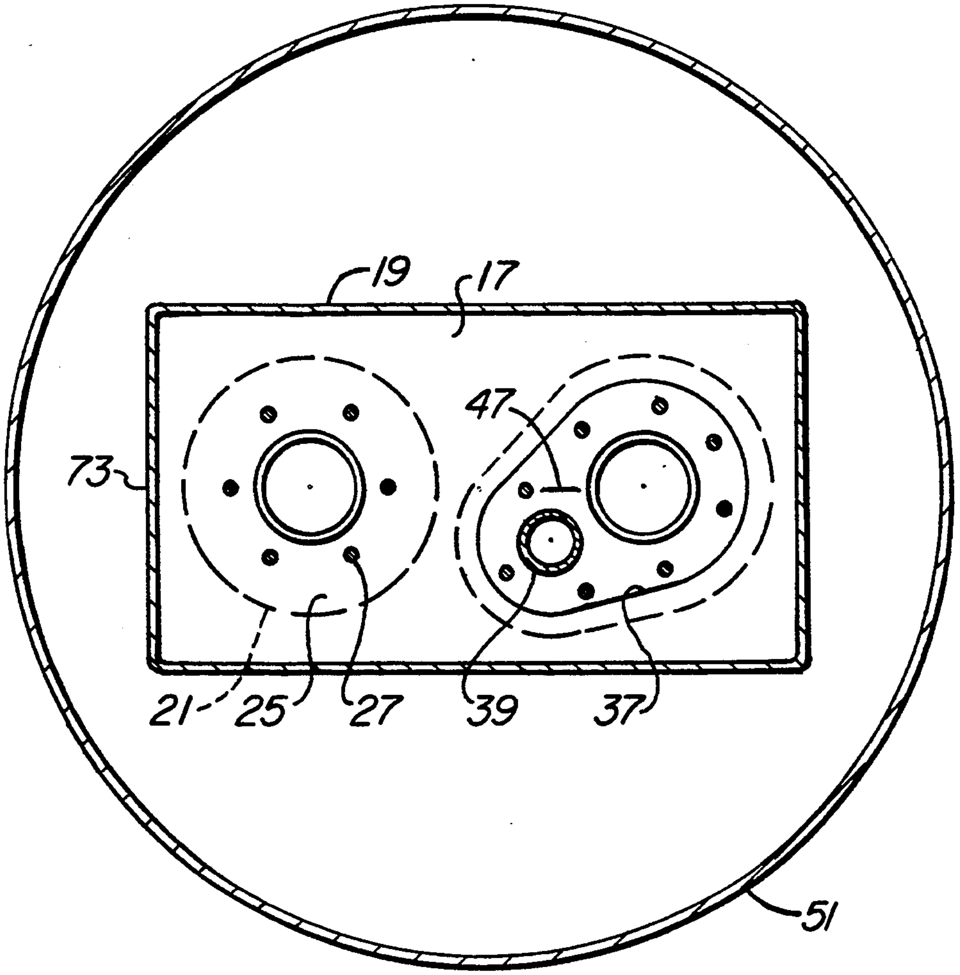
FIG. 4 is a sectional view taken on line 4—4 in FIG. 3.

An upper annular coupling flange 23 seats on the upper surface of the container bottom wall 17 about tube element **15*b*. The associated clearance opening 25 in wall 17 has a diameter appreciably greater than the diameter of tube element 15*a* or tube element 15*b*, whereby the container can be shifted laterally in any desired direction without producing an interference between the edge of clearance opening 25 and a set of screws 27 which extend downwardly from coupling flange 23 through the clearance opening into threaded holes in coupling flange 21. As shown in FIG. 4, the edge of opening 25 is spaced radially outwardly of the screws 27, thus to enable the container wall 17 to be slidably adjusted in position relative to the tube axis. Once an adjusted position has been determined, the screws are tightened to clamp coupling flanges 21 and 23 against the container bottom wall. An O-ring seal 29 may preferably be provided on the upper surface of coupling flange 21**.

The arrangement for connecting tube elements **13*a* and 13*b* is best shown in FIG. 2. A lower coupling flange 31 threads onto the upper end of lower tube element 13*a*. A second threaded area in coupling flange 31 receives the threaded lower end of upper tube element 13*b*, whereby the coupling flange forms a fluid connection between the two aligned tube elements, and fuel can flow downwardly through the aligned tube elements into fuel tank 11**.

Figure 5:
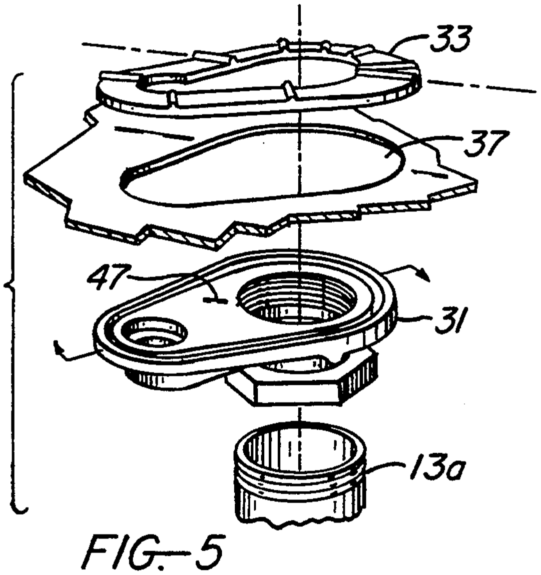
FIG. 5 is an exploded perspective view of an adjustable tube-container connection assembly utilized in the FIG. 1 spill containment system.

An upper coupling flange 33 seats on the upper surface of container bottom wall 17 about the tube element **13*b*. Screws 35 extend downwardly through flange 33 into threaded holes in lower flange 31, thus to clamp the flanges against the intervening container wall 17 to fix the tube assembly relative to the spill container. As with the tube 15 assembly, an enlarged oversize clearance opening 37 is defined in bottom wall 17 to permit transverse slidable adjustment of the container relative to tube 13. As shown in FIGS. 4 and 5, clearance opening 37 has a non-circular teardrop configuration to accommodate an auxiliary valve housing 39**.

As shown in FIG. 2, valve housing 39 is press fitted in a circular socket formed in the upper surface of coupling flange 31. A fluid passage system 41 extends internally within flange 31 between the lower face of valve housing 39 and an annular internal groove 42 located between the ends of tube elements **13*a* and 13*b*. Liquid can flow downwardly from valve housing 39 through passage system 41 and groove 42 for gravitational discharge into tube element 13*a***.

Valve housing 39 contains a poppet valve element 43 attached to a manually-operated pull rod operator 45.

Slot-like openings in the side wall of valve housing 39 admit liquid into the valve housing. When rod operator 45 is pulled upwardly, liquid can flow through the valve housing into passage 41 for eventual discharge into tank 11 via tube 13*a*. The auxiliary valve system is used for safe removal of any liquid fuel accumulations for spill container 19, e.g., after a tank-filling operation. During normal periods of operation the auxiliary valve is closed.

A principal feature of the invention is the adjustability provided by clearance openings 25 and 37 and the associated coupling flanges. Each set of coupling flanges is connected by a set of screws 35, whereby the spill container can fit tube assemblies of various different centerline spacings. In a typical installation procedure, the upper tube elements 13*b* and 15*b* are threaded into coupling flanges 31 and 21 after the spill container has been installed on the upper ends of tube elements 13*a* and 15*a*, e.g., by placing the container on coupling flanges 31 and 21, and threading screws 27 and 35 through coupling flanges 33 and 23 to clamp the container bottom wall between the opposed coupling flanges.

As shown in FIG. 4, the coupling flanges occupy a substantial portion of the total surface area of the container bottom wall. In order for the container to properly mate with the coupling flanges, the coupling flanges 31 should be oriented in a particular direction. The lower coupling flange 31 has a reference mark 47 on its upper surface. When flange 31 is properly oriented, reference mark 47 extends on a line generally toward the axis of tube assembly 15, as shown in FIG. 4. This feature permits the spill container to have reasonably small plan dimensions while still achieving the adjustability needed to compensate for variations in the centerline spacing of tubes 13 and 15.

Figure 7:
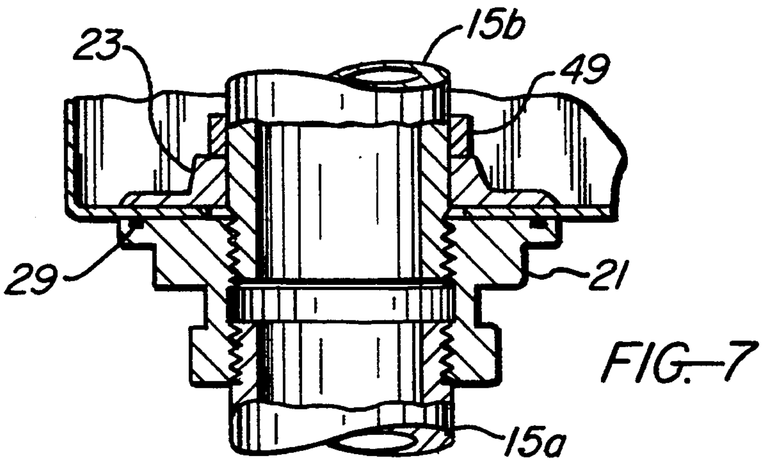
FIG. 7 is a fragmentary sectional view taken in the direction of FIG. 2, showing an alternate tube-container connecting assembly that may be utilized with the invention.

FIG. 7 illustrates an alternate mechanism which may be utilized to adjustably clamp the upper coupling flange to the container bottom wall. In this arrangement, screws 27 and 35 are not used. The upper tube element 15*b* has an annular pusher ring 49 located above its lower ends. As the tube element is threaded into the lower coupling flange 21, ring 49 forces coupling flange 23 against the container bottom wall, thereby achieving a clamp fit of the coupling flanges on the container bottom wall. A similar arrangement can be used for the other tube assembly 13.

The method of clamping depicted in FIG. 7 requires a relatively substantial turning force to achieve a clamp fit. FIG. 2 represents the preferred arrangement, because the individual screws 35 can be individually tightened to provide a relatively good clamp action about the entire coupling flange assembly, with a reasonably small turning force applied to each screw.

FIGS. 1 and 3 illustrate a further feature of the invention. As shown in FIG. 3, spill container 19 is disposed within a cylindrical casing 51 suitably embedded in a cast concrete apron 53. An annular steel ring 55 at the upper end of the casing serves to mount a flat steel cover 57. Cover 57 is preferably detachably connected to ring 55 at spaced points about the cover peripheral edge. FIG. 3 shows in broken lines a representative bracket (angle iron) structure 59 that may be affixed to ring 57 at discrete points about the ring periphery. A bolt (not shown) may be extended downwardly through cover 57 into each bracket to secure the cover in place.

Steel plate 57 has a rectangular opening therein roughly the size of the plan dimension of spill container 19. A number of upwardly facing channels 61 are welded to the edges of the rectangular opening in steel plate 57 to define an access opening for the space circumscribed by spill container 19. FIG. 1 fragmentarily shows the channel arrangement wherein the intersecting channels are connected at their ends to form a continuous water trough or channel about a central access opening 63. Access opening 63 may be subdivided into two smaller openings by a channel element 65 extending transversely across the space circumscribed by channels 61.

Channels 61 form a framework for supporting a removable cover or closure plate 67 which covers the entire access opening. The closure plate has a rectangular shape somewhat larger than the access opening 63. Peripheral edge areas 69 of the closure plate are inclined downwardly to seat against steel cover plate 57. The closure plate 67 can rest partly on channels 61 and partly on plate 57. Channel element 65 provides additional support for the closure plate. The closure plate 67 is retained in position by engagement of its downwardly extending flanges with channels 61 (FIG. 3). The downwardly inclined edge areas 69 of the closure plate seat against cover plate 57.

It is important that surface water be prevented from dropping into the spill container. Water mixed with liquid fuel is deemed hazardous waste under environmental regulations, and is quite expensive to remove to a hazardous waste site. To prevent surface water from passing through the access opening into the container interior, the channels 61 are arranged and adapted to conduct any surface water, such as water which may pass under the cover plate, across the access opening, thus to prevent it from falling downwardly into the spill container. As shown in FIG. 1, notches or slots are preferably formed in flanges of channels 61 to provide passage into and out of the channels 61.

Channels 61 provide attachment surfaces for a flexible sleeve 71 that extends between the casing cover and the upstanding annular side wall 73 of the spill container 19. Sleeve 71 is preferably an annular bellows having a multiple number of vertically spaced annular convolutions, whereby the flexible sleeve has sufficient slack to compensate for variations in the position of spill container 19 relative to the casing 51 and its cover 57. Sleeve 71 preferably has sealed liquid-tight connections with the casing cover and with the spill container side wall, thus to prevent entry of water into, or any escape of, liquid fuel from the container, as by splashing or possible flow across the container upper edge.

At its upper edge the flexible sleeve 71 is turned inwardly to seat against the lower surfaces of the various channels 61. In assembly, steel strips 74 are arranged underneath the sleeve inturned ends, after which small screws are extended through the channel web walls and small holes in the sleeve material into threaded openings in strips 74. A liquid-tight joint is thus formed between the upper end of sleeve 71 and channels 61.

A similar liquid-tight joint is formed between the lower edge of sleeve 71 and the container side wall 73. As shown in FIG. 3, the container side wall has an inwardly extended flange 75 at its upper end. The inturned lower end of flexible sleeve 71 is secured between flange 75 and flat steel strips 77 which extend along the sleeve end surface above flange 75. Small screws extend through holes in strips 77 and the sleeve material for threaded engagement with threaded openings in flange 75, whereby the flexible sleeve 75 has a liquid-tight connection with the spill container.

Sleeve 71 serves as a flexible connection between the spill container and the casing cover 57, whereby the casing, its cover and the spill container can have different orientations while maintaining the desired sealed relationship between the casing and the spill container side wall. As shown in broken lines in FIG. 3, the spill container can have a tilted relationship with the casing. Such a condition could result from the original disposition of the underground fuel tank 11 or from later uneven settling of the soil about the tank.

Another condition that may occur is the elevation of container 19 in a position relatively close to cover 57. In other cases the container might be lower. The condition or position of container 19 is dictated to a great extent by the position of the fill tubes and tank 19, although some adjustment can be achieved by shortening or lengthening the tube elements 13*a* and 15*a*, which may not easily be accomplished. Another condition that can occur is a lateral offsetting of the spill container relative to the overhead access opening 63. Sleeve 71 provides a flexible connection between the spill container and the casing cover 57, whereby the detrimental effects of these various conditions are overcome or alleviated.

Flexible sleeve 71 also provides the desired and needed action and results after installation of the spill containment system. Under frost conditions, the earth can thaw and freeze, resulting in earth movements, or earthquakes can cause earth movement and shifting. Such earth movements can cause change of position or orientation of tank 11 without any corresponding change in the position of casing 51, or vice versa. Sleeve 71 safely accommodates relative movements of the spill containment system components. Another situation involves earthquakes, wherein earth tremors tend to provide localized stresses which could break one or more connections in the spill containment system. Sleeve 71 will relieve such stresses, thereby tending to maintain the system intact.

The configurations of the casing, the container and the access opening may be other than rectilinear, i.e., circular, etc.

Figure 6:
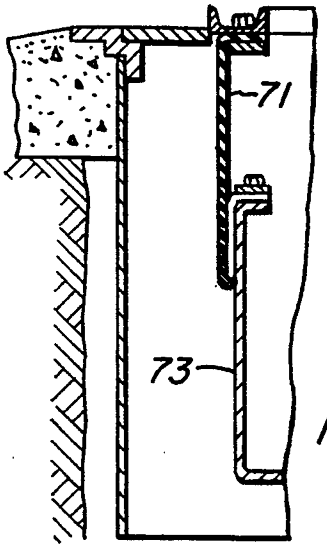
FIG. 6 is a fragmentary sectional view illustrating an alternate construction embodying the invention.

Sleeve 71 can take various forms. FIG. 6 shows an alternate sleeve construction, wherein the sleeve has the form of a bellofram element having sufficient slack to achieve the desired flexible connection between the spill container and the surrounding casing.

Thus there has been shown and described a novel fuel spill containment device which fulfills all the objects and advantages sought therefor. Many changes, modifications, variations and other uses and applications of the subject invention will, however, become apparent to those skilled in the art after considering this specification together with the accompanying drawings and claims. All such changes, modifications, variations and other uses and applications which do not depart from the spirit and scope of the invention are deemed to be covered by the invention which is limited only by the claims which follow.

The inventor claims:

1. A spill containment device for the fill tube of a liquid storage tank, comprising:

a casing to be recessed into the ground, said casing comprising a cover having an access opening therein, a removable closure for closing said access opening, a spill container located within said casing below the access opening, said container having a bottom wall and an annular upstanding side wall integrally joined to and extending upwardly from the bottom wall, a flexible sleeve having an upper annular edge thereof connected to the cover about the access opening, and a lower annular edge connected to said annular upstanding side wall, fill tube means extending upwardly through the container bottom wall so that the upper end of the tube means is accessible through the access opening, and wherein said flexible sleeve has slack therein, whereby the container is floatably adjustable vertically and laterally to compensate for variations in the position of the fill tube means relative to the cover.

2. The spill containment device of claim 1, wherein:

said flexible sleeve is a bellows having a multiplicity of vertically spaced convolutions therein.

3. The spill containment device of claim 1, wherein:

said cover comprises a relatively flat cover plate having said access opening centrally located in the plate, and a series of upwardly-facing water channels attached to the plate along the edges of said access opening and interconnected about said access opening, said channels being adapted to conduct surface water across the access opening.

4. The spill containment device of claim 3, wherein:

each channel has a horizontal web and two parallel upstanding flanges, and said sleeve has its upper annular edge attached to the channel webs to provide a liquid-tight joint between the flexible sleeve and said cover.

5. The spill containment device of claim 4, wherein:

said annular upstanding side wall has an inwardly extending flange, and said sleeve has its lower annular edge attached to said flange to provide a liquid-tight joint between the flexible sleeve and the spill container.

6. The spill containment device of claim 4, wherein:

said closure comprises a plate normally resting on the upstanding flanges of the water channels, said closure plate having a downwardly inclined peripheral edge portion seatable on said flat cover plate.

7. The spill containment device of claim 1, wherein:

said flexible sleeve is a bellows having an axial length about one-half the vertical length of the container side wall.

8. The spill containment device of claim 1, wherein said flexible sleeve is detachably connected with said cover.

9. The spill containment device of claim 8, wherein said flexible sleeve is detachably connected with the container side wall.

10. The spill containment device of claim 1, wherein:

said fill tube means comprises two separate tube assemblies extending through clearance openings in the container bottom wall, and each clearance opening being appreciably larger than the transverse dimension of the portion of the associated tube assembly within the respective clearance opening to compensate for variations in tube spacing.

11. The spill containment device of claim 10, wherein:

each tube assembly comprises an upper tube element and a lower tube element, each said upper tube element has a first coupling flange seating against the upper surface of the container bottom wall, each said lower tube element has a second aligned coupling flange seating against the undersurface of the container bottom wall, and a set of screws extending downwardly from each said first coupling flange into the associated second coupling flange, whereby the first and second coupling flanges are clamped to the container bottom wall, each set of screws extending through the associated clearance opening.

12. The spill containment device of claim 11, wherein:

the screws in each set of screws are so spaced that when the coupling flanges are loosely engaged with the container bottom wall the container can be shifted laterally in any direction prior to contact between the screws and the edges of the clearance openings.

13. The spill containment device of claim 11, wherein:

the screws in each set of screws are arranged in a pattern that parallels the edge of the associated clearance opening in the container bottom wall, and each screw pattern has a lesser transverse dimension than the corresponding dimension of the associated clearance opening whereby the container can be adjusted transversely in any direction without disturbing the screws.

14. The spill containment device of claim 11, wherein:

said second coupling flange for one of said tubes has an upwardly open socket therein, and further comprising a manually-operated valve means mounted in said socket, and an internal liquid passage communicating between socket and the associated lower tube element, whereby liquid fuel can be drained from the container through said valve means into the associated tube assembly when the valve means is in an open condition.

15. A spill containment device for an underground liquid storage tank, comprising:

a casing to be recessed into the ground, said casing comprising a cover having an access opening therein, a spill container located within said casing below the access opening, said container having a bottom wall and an annular side wall extending upwardly from the bottom wall, means connecting said container to said casing, a tank fill tube mechanism that includes two separate tube assemblies extending through oversize openings in the container bottom wall, so that an upper end of each tube assembly is accessible through the access opening, each tube assembly comprising a lower coupling flange seating against the undersurface of the container bottom wall, and an upper coupling flange seating against the upper surface of the container bottom wall, two sets of screws extending downwardly through the upper and lower coupling flanges of said tube assemblies, respectively, whereby the coupling flanges can be clamped to the container bottom wall, and each set of screws extending through one of the oversize openings in the container bottom wall, said openings being appreciably larger than the space circumscribed by the associated screws, whereby said oversize openings compensate for variations in the spacing of the tube assemblies.

16. The spill containment device of claim 15, wherein:

said connecting means comprises a flexible sleeve having one end thereof attached to the container side wall and the other end thereof attached to the cover.

17. The spill containment device of claim 15, wherein:

each tube assembly comprises an upper tube located within the container and a lower tube located below the container.

18. The spill containment device of claim 17, wherein:

each lower coupling flange has an upper threaded area engaged with the lower end of an associated upper tube, and a lower threaded area engaged with the upper end of an associated lower tube.

19. The spill containment device of claim 18, wherein:

each upper coupling flange is loosely positioned on the associated upper tube, whereby said upper coupling flange can move vertically without disturbing the connection between the upper tube and the lower coupling flange.

20. The spill containment device of claim 17, wherein:

one of the lower coupling flanges has an upwardly open socket therein, and further including manually-operated valve means mounted in said socket, and an internal liquid passage in said one lower coupling flange communicating between said socket and the associated lower tube, whereby liquid can be drained from the container through said valve means into the associated lower tube when said valve means is in an open condition.

21. A spill containment device for use with an underground storage tank having fill tube means accessible at ground level, comprising:

a casing to be recessed into the ground and having a normally upper end containing an access opening, a removable closure for closing said opening, a spill container within said casing below said access opening including a bottom wall and an annular upstanding side wall extending upwardly from the bottom wall, a flexible sleeve having an upper annular edge sealed to the upper end of said casing about said access opening, a lower annular edge sealed to the upper end of said annular upstanding side wall, and said sleeve having sufficient slack to permit limited endwise and lateral movement of said spill container relative to said casing, and said spill container bottom wall has opening means through which said fill tube means may extend.

22. A spill containment device for use with an underground storage tank, comprising:

a casing to be recessed into the ground and having a normally upper end containing an access opening, a removable closure for closing said opening, a spill container within said casing below said access opening including a bottom wall and an annular upstanding side wall extending upwardly from the bottom wall, a flexible sleeve having an upper annular edge sealed to the upper end of said casing about said access opening, a lower annular edge sealed to the upper end of said annular upstanding side wall, and said sleeve having sufficient slack to permit limited endwise and lateral movement of said spill container relative to said casing, at least one fill tube assembly for connection to said tank including a tube extending through an oversize clearance opening in said bottom wall which is substantially larger than the cross-section of said tube to permit limited relative movement of said tube and spill container in any lateral direction of said tube, a first flange at one side of said bottom wall sealed to said tube and seating against one side of said bottom wall about said oversize opening, a second flange at the opposite side of said bottom wall movable endwise of said tube and seating against the other side of said bottom wall about said oversize opening, and means for urging said flanges toward one another into sealing and gripping contact with said bottom wall about said oversize opening.

23. A spill containment device for use with an underground storage tank, comprising:

a casing to be recessed into the ground and having a normally upper end containing an access opening, a removable closure for closing said opening, a spill container within said casing below said access opening including a bottom wall and an annular upstanding side wall extending upwardly from the bottom wall, means securing and sealing the upper end of said spill container side wall to the upper end of said casing about said access opening, at least one fill tube assembly for connection to said tank including a tube extending through an oversize clearance opening in said bottom wall which is substantially larger than the cross-section of said tube to permit limited relative movement of said tube and spill container in any lateral direction of said tube, a first flange at one side of said bottom wall sealed to said tube and seating against one side of said bottom wall about said oversize opening, a second flange at the opposite side of said bottom wall movable endwise of said tube and seating against the other side of said bottom wall about said oversize opening, and means for urging said flanges toward one another into sealing and gripping contact with said bottom wall about said oversize opening.

* * * * *